ated under 35 U.S.C. 154(b) by 762 days.

(12) United States Patent
Paquette

(10) Patent No.: US 7,085,432 B2
(45) Date of Patent: Aug. 1, 2006

(54) EDGE DETECTION USING HOUGH TRANSFORMATION

(75) Inventor: Daniel R. Paquette, Apalachin, NY (US)

(73) Assignee: Lockheed Martin Corporation, Owego, NY (US)

(*) Notice: Subject to any disclaimer, the term of this patent is extended or adjusted under 35 U.S.C. 154(b) by 762 days.

(21) Appl. No.: 10/166,407

(22) Filed: Jun. 10, 2002

(65) Prior Publication Data

US 2003/0228057 A1 Dec. 11, 2003

(51) Int. Cl.
*G06K 9/36* (2006.01)
*G06K 9/48* (2006.01)
*G06K 9/00* (2006.01)

(52) U.S. Cl. ............... 382/281; 382/199; 382/101; 382/102

(58) Field of Classification Search ........... 382/199, 382/281
See application file for complete search history.

(56) References Cited

U.S. PATENT DOCUMENTS

| 5,638,116 | A | * | 6/1997 | Shimoura et al. | ........... 348/118 |
| 5,642,442 | A | | 6/1997 | Morton et al. | |
| 5,770,841 | A | | 6/1998 | Moed et al. | |
| 6,137,893 | A | * | 10/2000 | Michael et al. | ............. 382/103 |
| 6,201,901 | B1 | * | 3/2001 | Zhou et al. | ................. 382/306 |
| 6,901,167 | B1 | * | 5/2005 | Herley | ...................... 382/199 |

2002/0196977 A1 * 12/2002 Navon .................. 382/176

FOREIGN PATENT DOCUMENTS

WO 9630860 10/1996

OTHER PUBLICATIONS

Zhou Y., Tan C., "Hough Technique for Bar Charts Detection and Recognition in Document Images", Proc. of 7th IEEE International Conference on Image Processing, Sep. 10-13, 2000, pp. 605-608.*
Kamat V., Subramaniam G., "An Efficient Implementation of the Hough Transform for Detecting Vehicle License Plates Using DSP'S", Proc. of 1st IEEE symposium on Real-Time Technology and Applications, 1995, pp. 58-59.*

(Continued)

*Primary Examiner*—Wenpeng Chen
*Assistant Examiner*—Utpal Shah
(74) *Attorney, Agent, or Firm*—Tarolli, Sundheim, Covell & Tummino LLP

(57) ABSTRACT

A method identifies edges of an object in an image by analyzing an accumulator array produced via a Hough transformation of the image. The method includes the step of identifying a first cell in a first row of the array associated with a first edge of the object. The first is then searched for a second cell in the array associated with a second edge of the object, the second edge being parallel to the first edge. A second row shifted ninety degrees from the first row is then searched for a third cell in the array associated with a third edge of the object, the third edge being perpendicular to the first edge. The second row is then searched for a fourth cell in the array associated with a fourth edge in the image, the fourth edge being parallel to the third edge.

16 Claims, 4 Drawing Sheets

OTHER PUBLICATIONS

International Search Report PCT/US96/04036.

Use of the Hough Transformation to Detect Lines and Curves in Pictures, Richard O. Duda and Peter E. Hart of the Stanford Research Institute.

Yan Ping Zhou et al. "Hough Technique for Bar Charts Detection and Recognition in Document Images", Proceedings of 7th IEEE International Conference on Image Processing, Vancouver, BC, Canada, Sep. 10-13, 2000, pp. 605-608.

Lopez Krahe J. et al. "The Application of the Hough Transform to the Detection of Roads", Signal Processing: Theories and Applications—Grenoble, Sep. 5-8, 1988, Proceedings of the European Signal Processing Conference (EUSIPCO), Amsterdam, North Holland, NL, vol. 3, Conf. 4, Sep. 5, 1988, pp. 1673-1676, Sections 2.24.1, 4.2, Fig. 4C.

Liados J et al. "A System to Understand Hand-Drawn Floor Plans Using Subgraph Isomorphism and Hough Transform", Machine Vision and Applications, 1997, Springer-Verlag, USA vol. 10, No. 3, pp. 150-158, Sections 3, 3.1, Fig. 4.

International Search Report PCT/US 02/18337.

* cited by examiner

EDGE DETECTION USING HOUGH TRANSFORMATION

FIELD OF THE INVENTION

The present invention relates to a system and method for identifying edges of an object in an image via analysis of a Hough transformation of the image.

BACKGROUND OF THE INVENTION

There are a variety of applications in which it may be desirable to determine the location of objects in an image. For example, in an optical character recognition (OCR) application used to recognize text characters in an image of a document, it may be desirable to determine the bounds and/or position of the document on the image. Thus, in the OCR application, it may be desirable to distinguish the document portion of the image from the rest of the image. This allows the OCR application to focus only on the document portion of the image.

Another application in which it may be desirable to determine the location of objects in an image relates to the automated processing (e.g., sorting, routing, postage checking, etc.) of parcels of mail. In this application, an image of a mail parcel is generated and analyzed in order to determine information, such as the destination address, return address, and indicia (i.e., postage mark, stamp, etc.) on the parcel. This information can then be used to determine how to process the mail parcel.

It will be appreciated that mail parcels may have a variety of shapes and sizes. The area scanned in order to generate the image of the parcel must thus be large enough to accommodate these varying shapes and sizes. As a result, the parcel may comprise only a portion of the image. The orientation of the parcel in the image may also vary. Thus, it is desirable to distinguish the portion of the image including the parcel from other areas in the image.

SUMMARY OF THE INVENTION

The present invention is directed to a system and method for identifying edges of an object in an image. According to one aspect of the present invention, the invention relates to a method for identifying edges of an object in an image by analyzing an accumulator array produced via a Hough transformation of the image. The array includes a plurality of rows each including a plurality of cells. The method includes the step of identifying a first cell in a first row of the array associated with a first edge of the object. The method also includes the step of searching the first row for a second cell in the array associated with a second edge of the objects the second edge being parallel to the first edge. The method also includes the step of searching a second row of the array shifted ninety degrees from the first row for a third cell in the array associated with a third edge of the object, the third edge being perpendicular to the first edge. The method further includes the step of searching the second row for a fourth cell in the array associated with a fourth edge in the image, the fourth edge being parallel to the third edge.

According to another aspect of the present invention, the invention relates to a computer product for identifying edges of an object in an image by analyzing an accumulator array produced via a Hough transformation of the image, the array including a plurality of rows each including a plurality of cells. The computer product includes a portion for identifying a first cell in a first row of the array associated with a first edge of the object. The computer product also includes a portion for searching said first row for a second cell in the array associated with a second edge of the object, the second edge being parallel to the first edge. The computer product also includes a portion for searching a second row of the array shifted ninety degrees from the first row for a third cell in the array associated with a third edge of the object, the third edge being perpendicular to the first line. The computer product further includes a portion for searching the second row for a fourth cell in the array associated with a fourth edge in the image, the fourth edge being parallel to the third edge.

According to another aspect of the present invention, the invention relates to a method for identifying edges of an object in a graphical image by analyzing a Hough image of the graphical image. The method includes the step of searching the Hough image from a first edge of the Hough image towards the center of the Hough image for a first cell in the Hough image indicative of a first potential edge line in the graphical image. The method also includes the step of searching the Hough image from a second edge of the Hough image opposite the first edge towards the center of the Hough image for a second cell in the Hough image indicative of a second potential edge line in the graphical image extending parallel to the first potential edge line. The method also includes the step of searching the Hough image from the first edge towards the center of the Hough image for a third cell in the Hough image indicative of a third potential edge line in the graphical image extending perpendicular to the first potential edge line. The method further includes the step of searching the Hough image from the second edge towards the center of the Hough image for a fourth cell in the Hough image indicative of a fourth potential edge line in the graphical image extending parallel to the third potential edge line.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF AN EMBODIMENT

The field of the present invention relates to identifying lines in an image via analysis of a Hough transformation of the image. In the illustrated embodiment, the present invention relates to a system and method for detecting edges of an object in an image using a Hough transformation of the image. In the illustrated embodiment, the object is a parcel of mail. Those skilled in the art, however, will appreciate that the present invention could be used in other applications where it is desirable to detect lines in an image using a Hough transformation of the image.

Figure 1:
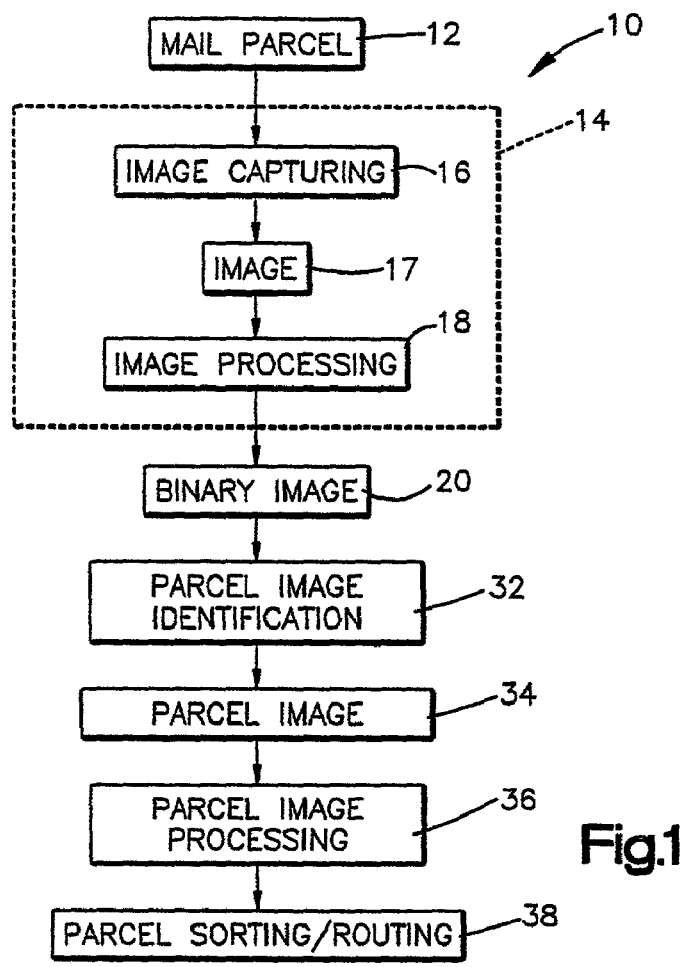
FIG. 1 is a functional block diagram illustrating a system for identifying a edges of an object in an image using a Hough transformation, according to an illustrated embodiment of the present invention.

FIG. 1 illustrates a system 10 in which the method of the present invention may be implemented to identify a mail parcel 12 in an image. The system 10 includes an image processor 14 comprising an image capturing portion 16 and an image processing portion 18. The image capturing portion 16 comprises means, such as a digital camera, for capturing an image, indicated at 17. The mail parcel 12 is passed by the image capturing portion 16 by known means (not shown), such as a conveyor or other mail handling equipment. The image 17, which includes the mail parcel 12, is captured by the image capturing portion 16 as the parcel passes by. The image 17 is preferably a grayscale image, such as an eight-bit, 256 color digital grayscale image.

The image 17 is provided to the image processing portion 18. The image processing portion 18 performs a known binarization process on the image 17 to convert the image to a binary form. The image processor 14 thus produces a binary image, indicated at 20, representative of the image 17. As known in the art, the binary image 20 comprises a digital array of black and white pixels representative of the image 17 from which the binary image was generated.

The image processing portion 18 may also perform pre-processing on the image 17 before converting the image to the binary image 20. This may be done in order to reduce the amount of data in the image and thus increase the speed at which the image can be processed. This pre-processing may include sub-sampling of the image 17 to reduce the size of the image. In the sub-sampling process, a group of pixels in the grayscale image 17 would be analyzed to determine the average grayscale intensity of the pixels in the group. This group of pixels would then be converted to a single pixel in a reduced image, the single pixel having the average grayscale intensity. For example, a 4096×4096 pixel image may have 16×16 pixel areas sub-sampled to provide a reduced image of 256×256 pixels. Of course, the sub-sampling should be of a degree such that the reduced image still contains the relevant information. The sub-sampled image would then be binarized to produce the binary image 20.

The binary image 20 is provided to a parcel image identification portion 32 of the system 10. The parcel image identification portion 32 is operative to identify the region in the image that includes the mail parcel 12 by analyzing the data contained in the binary images 20.

Figure 2:
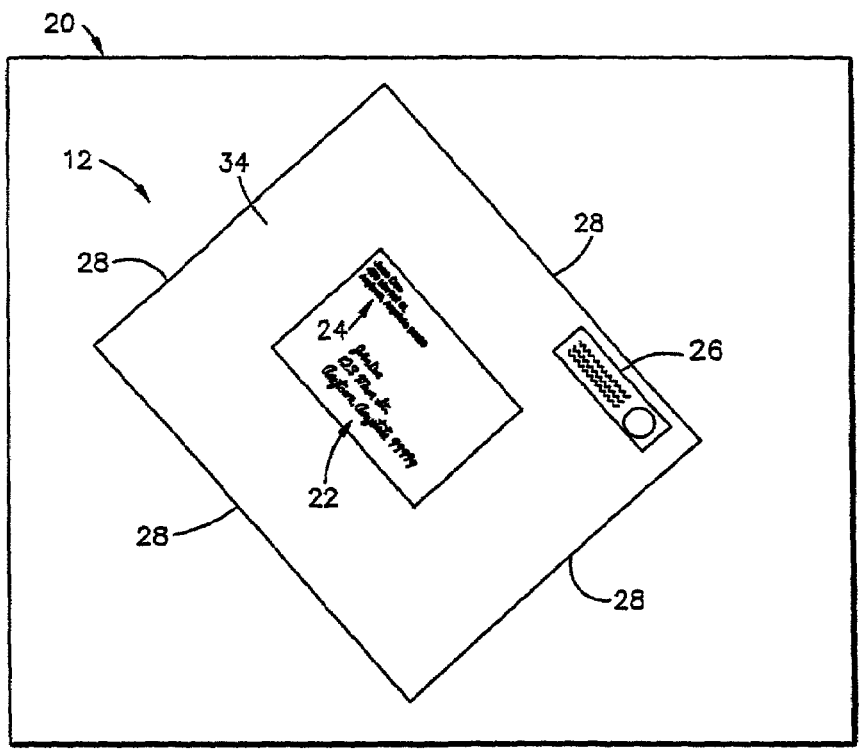
FIG. 2 is a schematic representation of an image generated and evaluated by the system of FIG. 1.

FIG. 2 illustrates an example of the binary image 20 produced by the image processor 14. As shown in FIG. 2, the mail parcel 12 occupies a portion of the binary image 20. The mail parcel 12 illustrated in FIG. 2 is that of a typical package but could, however, be any type of parcel, such as an envelope, periodical, flyer, etc.

As shown in FIG. 2, the parcel 12 may have an angled orientation with respect to the axes (edges) of the image 20. The parcel 12 includes regions of interest that may include information relevant to sorting and/or routing the parcel. Such information may include the destination address 22, return address 24, and indicia 26, such as postage stamps, meter marks, bar codes, or any other type of marking used to identify postage affixed to the parcel 12.

The parcel image identification portion 32 (FIG. 1) is operative to identify a parcel image 34, that is, the portion of the binary image 20 that includes the parcel 12. The parcel image identification portion 32 may be embodied as a computer program compilable to provide a computer product (i.e., program) executable to determine the portion of the binary image 20 that includes the parcel 12. It will thus be appreciated that the system 10 may comprise any computer means suited to provide a platform upon which to execute the computer product of the parcel image identification portion 32.

The parcel image 34 is identified by identifying the edges 28 of the parcel 12 in the binary image 20. According to the present invention, the edges 28 of the parcel 12 are identified in the binary image 20 via analysis of a Hough transformation of the binary image. The Hough transformation is a method known in the art for identifying lines (straight lines, curves, circles, etc.) in an image. According to the present invention, the Hough transformation is used to detect straight lines in the binary image 20 that are representative of the generally rectangular edges 28 of the parcel 12.

The Hough transformation method relies on a parametric representation of points in the binary image 20. This representation is based on the principal that a straight line in a Cartesian (X-Y) coordinate plane may be represented by a single point in a Hough Parameter Plane. This is illustrated in FIGS. 4A and 4B.

Figure 4A:
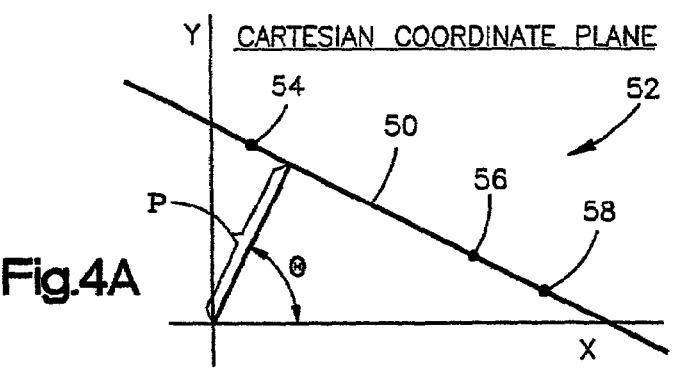
FIGS. 4A and 4B are graphs illustrating a Hough transformation process performed during a step in the process of FIG. 3.
Figure 4B:
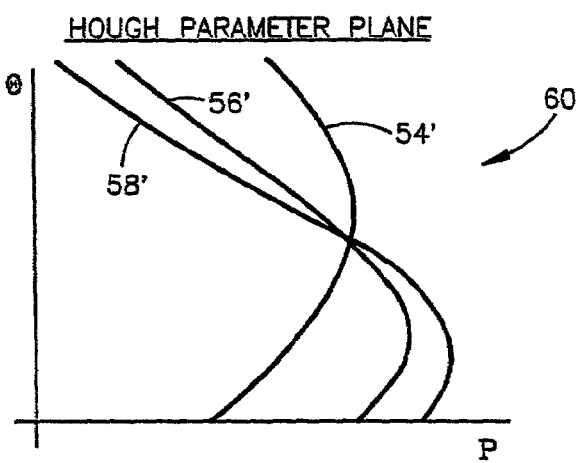

Referring to FIG. 4A, a line 50 is represented in a Cartesian coordinate plane 52. According to the Hough transformation, any straight line in a Cartesian coordinate system can be parameterized in terms of an angle θ and an algebraic distance ρ. As illustrated in FIG. 4A, the angle θ is the angle with respect to the X-axis of a line extending through the origin and perpendicular (normal) to the line 50. The distance ρ is the distance along this normal line from the line 50 to the origin of the coordinate plane 52.

According to the Hough transformation, a parametric characterization of a straight line is given as:

$$\rho = x(\cos\theta) + y(\sin\theta) \quad (1)$$

where x and y are the Cartesian (x,y) coordinates of any point on the line. According to this characterization, a point on the straight line 50 in the Cartesian coordinate plane 52 may be parameterized (i.e., transformed) in accordance with Equation (1) to a sinusoidal curve in a parametric plane. Thus, co-linear Cartesian points $(x_i, y_i)$ where i=1, ... ,N may be transformed to N sinusoidal curves in a parametric plane. This plane, referred to herein as a Hough parameter plane, is illustrated at 60 in FIG. 4B.

Referring to FIG. 4A in conjunction with FIG. 4B, co-linear points indicated at 54, 56, and 58 in the Cartesian coordinate plane 52 of FIG. 4A are transformed to sinusoidal curves 54', 56', and 58', respectively, in the Hough parameter plane 60 of FIG. 4B. The Hough parameter plane 60 plots the distance ρ on the horizontal axis versus the angle θ on the vertical axis. This transformation is done by applying Equation 1 to the x-y coordinates of each co-linear point and calculating ρ for θ=0–360 degrees. According to the Hough transformation, the curves 54', 56', and 58' intersect at coordinates (ρ,θ) in the Hough parameter plane 60 that correspond to the distance ρ and the angle θ associated with the line 50 and illustrated in the Cartesian coordinate plane 52 of FIG. 4A.

There are several properties realized in the parametric relationship provided by the Hough transformation illustrated in FIGS. 4A and 4B. A point in the Cartesian coordinate plane 52 corresponds to a sinusoidal curve in the Hough parameter plane 60. Conversely, a point in the Hough parameter plane 60 corresponds to a straight line in the Cartesian coordinate plane 52. From these properties, it will thus be appreciated that points lying on the same straight line in the Cartesian coordinate plane 52 correspond to sinusoidal curves through a common point in the Hough parameter plane 60. Further, points lying on the same curve in the Hough parameter plane 60 correspond to straight lines through the same point in the Cartesian coordinate plane 52.

Figure 3:
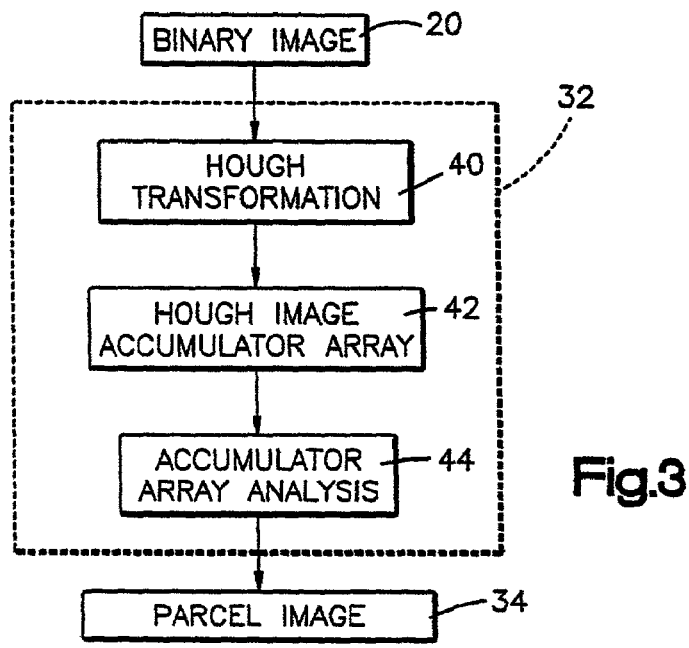
FIG. 3 is a functional block diagram illustrating a process performed in a portion of the system of FIG. 1.

Referring to FIG. 3, the parcel image identification portion 32 includes a portion 40 for performing a Hough transformation on the binary image 20. The Hough transformation portion 40 is operative to generate a Hough image in the form of an accumulator array 42 in a manner known in the art. Basically, the pixels in the binary image 20 are mapped to a Cartesian coordinate system. The Hough transformation portion 40 steps sequentially through each pixel in the binary image 20 and extracts the coordinates (x,y) for each black pixel in the binary image 20. The Hough transformation portion 40 constructs a sinusoidal curve in the Hough image for each black pixel in accordance with Equation (1).

The Hough image is constructed as an accumulator array 42 comprising a plurality of rows each including a plurality of cells. The accumulator array 42 is a two-dimensional data array wherein one dimension represents the angle $\theta$ and the other dimension represents the distance $\rho$. In the illustrated embodiment, the rows in the array 42 correspond to the angle $\theta$ and the columns in the array correspond to the distance $\rho$. Each cell of the array 42 is thus associated with an angle $\theta$ and a distance $\rho$. The angle $\theta$ and distance $\rho$ may be represented in the accumulator array 42 at any desired resolution. For example, the resolution of the angle $\theta$ may be 1 degree and the resolution of the distance $\rho$ may be 1 pixel. The resolution could, however, be higher or lower, depending on factors such as desired accuracy/error limits, processing speed, memory, etc.

Each cell in the accumulator array 42 is initialized with an integer value of zero. As the sinusoidal curves are plotted in the accumulator array 42, the values of the cells are incremented by one for each curve that passes through the cell. As stated above, points lying on the same straight line in a Cartesian coordinate plane (i.e., the binary image 20) correspond to sinusoidal curves through a common point in the Hough parameter plane (i.e., the accumulator array 42). Thus, the cells in the accumulator array 42 with high values relative to the other cells may be associated with intersecting sinusoidal curves indicative of straight lines in the binary image 20. Each cell in the accumulator array 42 is thus representative of parametric data (angle $\theta$, distance $\rho$, and length/magnitude) of a straight line in the binary image 20. The angle $\theta$ and distance $\rho$ associated with these cells can therefore be used to help identify straight lines, and thus the edges 28 (FIG. 2), of the parcel 12 in the binary image 20. The magnitude of the cell may be used to approximate the length of the straight line represented by the cell.

Those skilled in the art will appreciate that the binary image 20 may include straight lines other than those indicative of the edges 28 of the parcel 12. Typically, the data in the accumulator array 42 is analyzed in a manner wherein all of the cells in the accumulator array 42 are analyzed to find every possible straight line in the image. All of these possible straight lines are then analyzed to determine which of the lines are indicative of the edges 28 of the parcel 12 in the image 20. This approach is undesirable because it involves the unnecessary analysis of lines that are not indicative of the parcel edges. According to the present invention, an accumulator array analysis portion 44 of the parcel image identification portion 32 helps avoid such unnecessary analysis. The accumulator array analysis portion 44 is operative to analyze the data in the accumulator array 42 in a systematic and efficient manner to identify the parcel image 34 by finding those straight lines in the binary image 20 that are most likely to be indicative of the edges 28 of the parcel 12.

Figure 5:
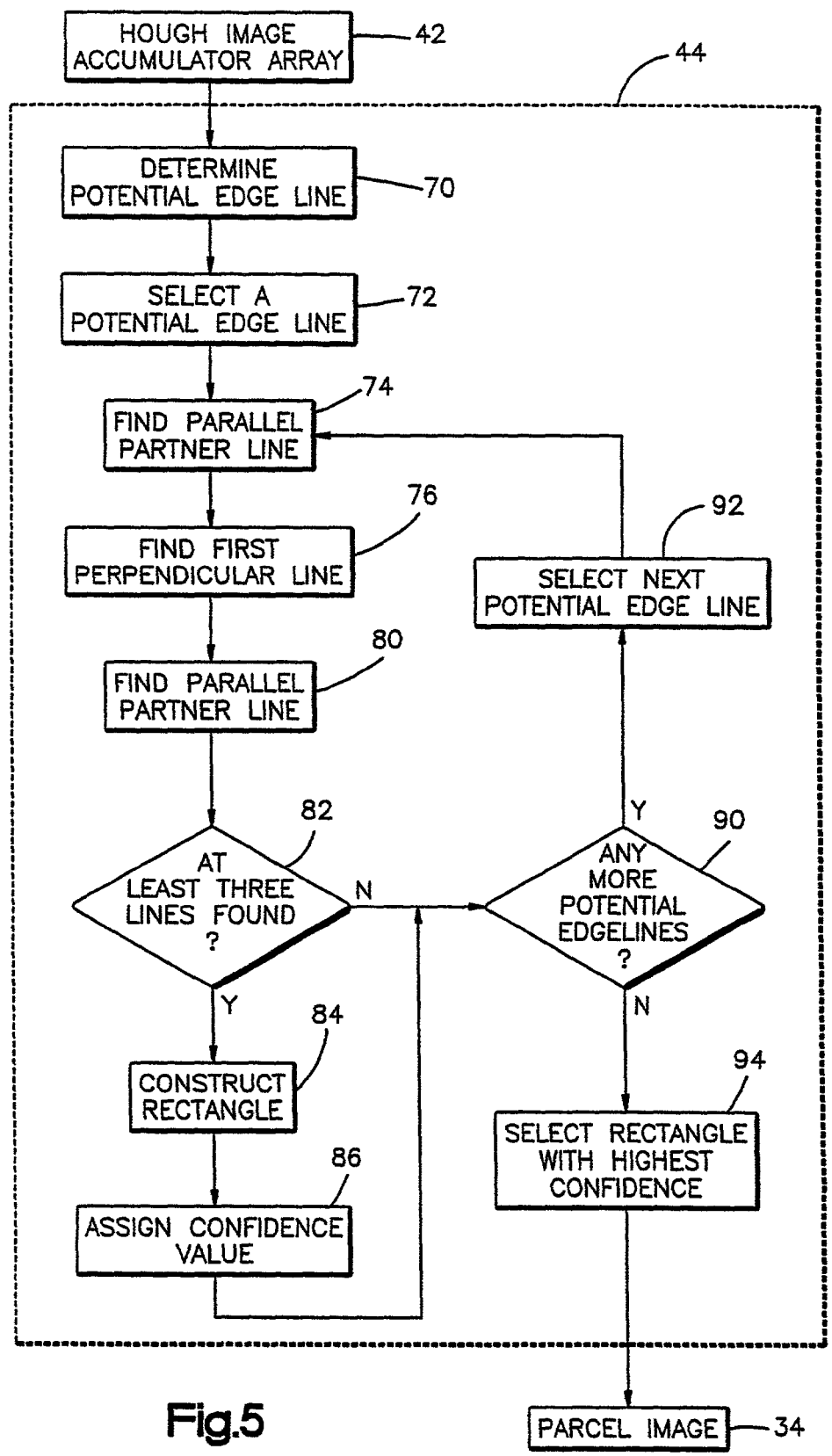
FIG. 5 is a functional block diagram illustrating a process performed during a step in the process of FIG. 3.

The accumulator array analysis portion 44 is illustrated in FIG. 5. In this description of the present invention, the use of the word "step" is used to describe functions performed during various processes performed by the accumulator array analysis portion 44. At step 70, cells in the accumulator array 42 are identified as potential edge lines. The potential edge lines are determined by systematically stepping through the cells in the accumulator array 42 to determine which cells have a magnitude above a predetermined threshold indicative of a line in the binary image 20.

The predetermined threshold magnitude required to indicate a potential edge line may be determined based upon a variety of factors, such as the resolution and/or size of the graphical image. For example, it will be appreciated that the maximum magnitude of a cell indicative of a single line would be about equal to the length (i.e., number of pixels) in the longest line possible in the binary image 20. Thus, the predetermined magnitude required to indicate a potential edge line may be determined as a percentage of this maximum magnitude.

Figure 6:
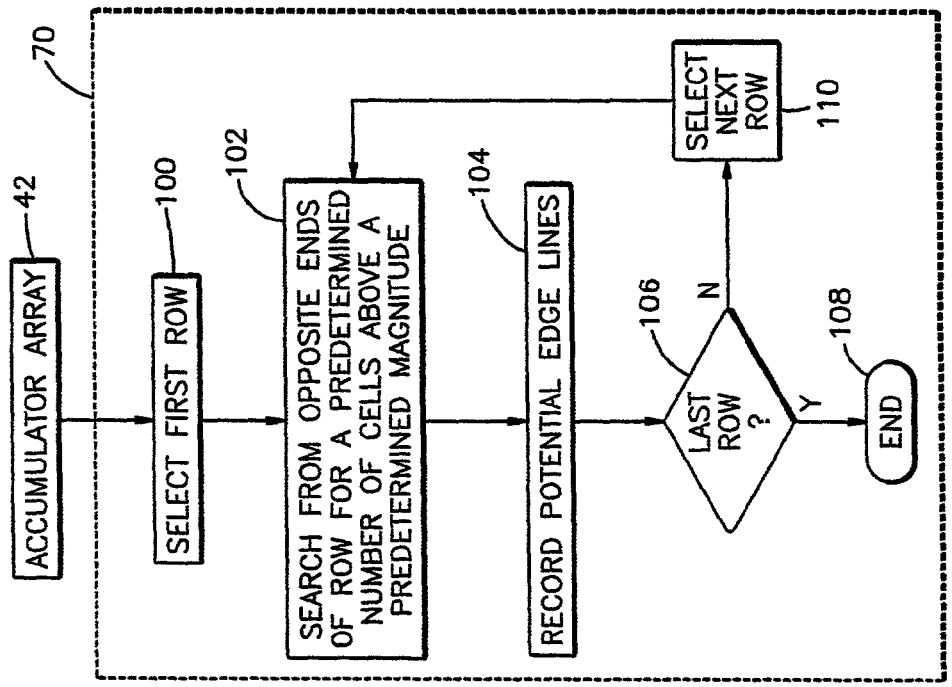

The process performed at step 70 is illustrated in FIG. 6. The potential edge line determination process of step 70 identifies the potential edge lines by analyzing rows in the accumulator array 42. Each row of the accumulator array 42 corresponds to a particular angle $\theta$ and includes a cell for each increment of the distance $\rho$ in the Hough image represented by the array. Thus, in an accumulator array 42 for a Hough image transformed in one degree increments, there would be 360 rows each having a number of cells corresponding to the number of incremental distances $\rho$ transformed to the Hough image.

At step 100, a first row in the accumulator array 42 is selected for analysis. The first row may be selected in any order, preferably in a bottom-to-top or top-to-bottom manner. At step 102, the cells in the selected row are examined by stepping through the cells from opposite ends of the row inward toward the center of the row. This is done in an alternating manner in which the outermost cell at a first end of the row is examined, then the outermost cell at a second end opposite the first end is examined, then the second outermost cell at the first end is examined, and so on. This is done so that the Hough image is analyzed from the edges of the image towards the center of the image at each increment of the angle $\theta$. Since the object is to determine the edges 28 of the parcel 12, the outermost lines in the image are the most likely to be indicative of the edges 28.

At step 102, the process searches the selected row for cells having a magnitude above the predetermined threshold. Once a predetermined number of cells having a magnitude above the threshold are identified, the process skips to the next row regardless of whether the entire row has been searched. This is done to help prevent the unnecessary examination of cells for lines that lie within the edges 28 of the parcel 12. For example, at step 102, the process may search the selected row from opposite ends of the row until two cells having a magnitude above the threshold are identified. Also, once a cell having the requisite magnitude is identified while stepping in from one end of the row, the search may continue from the opposite end of the row only. This may further help to identify only the outermost lines in the image.

Once the search of the selected row is completed, the process proceeds to step 104, where the parametric data (angle $\theta$, distance $\rho$, and magnitude) for any cells associated with potential edge lines identified in the row are recorded. Once the potential edge lines are recorded, the process proceeds to step 106, where a determination is made as to whether the selected row is the last row in the accumulator array 42. If the selected row is the last row, the process ends at step 108. If the selected row is not the last row, the process proceeds to step 110 where the next row in the accumulator array 42 is selected. The process then proceeds back to step 102, where the selected row is searched for cells that may be identified as potential edge lines and the process continues as described above. The process performed at step 70 is thus operative to analyze each row of the accumulator array 42 in a systematic and efficient manner to determine a set of potential edge lines in the accumulator array 42.

Those skilled in the art will appreciate that, for a variety of reasons, the edges 28 of the parcel 12 in the binary image 20 may not appear as straight lines. This may be because the edges 28 are, in fact, not purely straight, as may be the case with padded envelope type parcels. Also, noise may be introduced during the image capturing and processing portions of the system 10. Thus, it may be desirable to introduce error compensation factors into the potential edge line determination portion 70 of the accumulator array analysis 44. This may be done, for example, by searching for regions of cells (e.g., 2×2, 3×3, etc.) that collectively have a magnitude above the predetermined threshold. Thus, as any particular cell in a row is selected for analysis, a predetermined number of adjacent cells would also be selected for analysis. When the magnitude of the region indicates a potential edge line, the location of the cell indicative of the potential edge line in the accumulator array 42 may be determined at the geometric center of the region or by a center of mass type calculation for the region.

Once the set of potential edge lines are determined at step 70 (FIG. 5), the process of the accumulator array analysis 44 proceeds to step 72, where a potential edge line is selected from the set. The potential edge line may be selected in any manner, such as in the order in which the potential edge lines were identified at step 70. Once the potential edge line is selected, the process proceeds to step 74.

At step 74, the accumulator array 42 is searched for a cell indicative of a parallel partner line for the selected potential edge line. It will be appreciated that the cells in any given row of the accumulator array 42, i.e., cells having the same angle θ, represent parallel lines in the binary image 20 (FIG. 1). Thus, at step 74 (FIG. 5), the row in the accumulator array 42 that includes the potential edge line is searched for the parallel partner line. This search is preferably done from the end of the row inwards toward the potential edge line in case there are multiple parallel partners to the potential edge line. For this same reason, this search may also be done from the end of the row opposite the end from which the selected potential edge line was found. This helps ensure that the parallel partner spaced farthest from the potential edge line is identified at step 74. If found, the parametric data (angle θ, distance ρ, and magnitude) for the parallel partner line is recorded.

In searching for the parallel partner line, the row is searched for cells having a magnitude above a predetermined threshold indicative of a line in the image. This threshold may be similar to or identical to the threshold used to identify the potential edge lines at step 70. It will also be appreciated that, since the magnitude of any given cell is indicative of the pixel length of the line represented by that cell, the row may also be searched for cells having a magnitude equal to or within a predetermined margin of the magnitude of the potential edge line. If a parallel partner line is identified, the process proceeds to step 76 regardless of whether all of the cells in the row have been analyzed. Once the search for the parallel partner line is completed, the process proceeds to step 76 regardless of whether a parallel partner line is found.

At step 76, the accumulator array 42 is searched for a cell indicative of a first line perpendicular to the line indicated by the selected potential edge line. It will be appreciated that the cells in row of the accumulator array 42 having an angle θ offset or shifted by ninety degrees, or within some predetermined margin thereof, represent lines extending perpendicular to the line indicated by the potential edge line. Thus, at step 76, the rows in the accumulator array 42 that are shifted ninety degrees±the predetermined margin are searched for cells having a magnitude above a predetermined threshold indicative of a line in the image. This threshold may be similar to or identical to the threshold used to identify the potential edge lines at step 70.

The search for the first perpendicular line is done from an end or from opposite ends of the row(s) to help ensure that the outermost perpendicular line is identified first. For example, the search may begin at the end of the row that coincides with the end from which the selected potential edge line. If found, the parametric data (angle θ, distance ρ, and magnitude) for the first perpendicular edge line is recorded. If a first perpendicular line is identified, the process proceeds to step 80 regardless of whether all of the cells in the row have been analyzed. Once the search for the first perpendicular line is completed, the process proceeds to step 80 regardless of whether a first perpendicular line is found.

At step 80, the accumulator array 42 is searched for a cell indicative of a parallel partner line for the first perpendicular line. The row in the accumulator array 42 that includes the first perpendicular line is searched for cells having a magnitude above a predetermined threshold indicative of a line in the image. This threshold may be similar to or identical to the threshold used to identify the potential edge lines at step 70. Since the parallel edges of the parcel should be about equal in length, the row could be searched for cells having a magnitude equal to or within a predetermined margin of the magnitude of the first perpendicular point.

The search for the parallel partner for the first perpendicular line is preferably done from the end of the row opposite the end from which the first perpendicular line was identified. This helps ensure that the parallel partner line spaced farthest from the first perpendicular line is identified. If found, the parametric data (angle θ, distance ρ, and magnitude) for the parallel partner line for the first perpendicular line is recorded. If a parallel partner line for the first perpendicular line is identified, the process proceeds to step 82 regardless of whether all of the cells in the row have been analyzed. Once the search for a parallel partner line for the first perpendicular line is completed, the process proceeds to step 82 regardless of whether a parallel partner line is found.

It will be appreciated that, at any of steps 74, 76, and 80a, a line may not be identified. At step 82, a determination is made as to whether at least three lines, including the potential edge line, have been identified. Thus, at step 82, a determination is made as to whether a rectangle can be constructed using the lines identified at steps 72, 74, 76, and 80 as sides. If at least three lines have not been identified, a rectangle cannot be constructed and the process proceeds to step 90, where a determination is made as to whether there are any more potential edge lines. If there are more potential edge lines, the process proceeds to step 92, where the next potential edge line is selected. The process then proceeds to step 74, and the process continues as described above. If, at step 82, at least three lines are identified, the process proceeds to step 84, where a rectangle is constructed using the recorded data associated with the identified lines.

Figure 7:
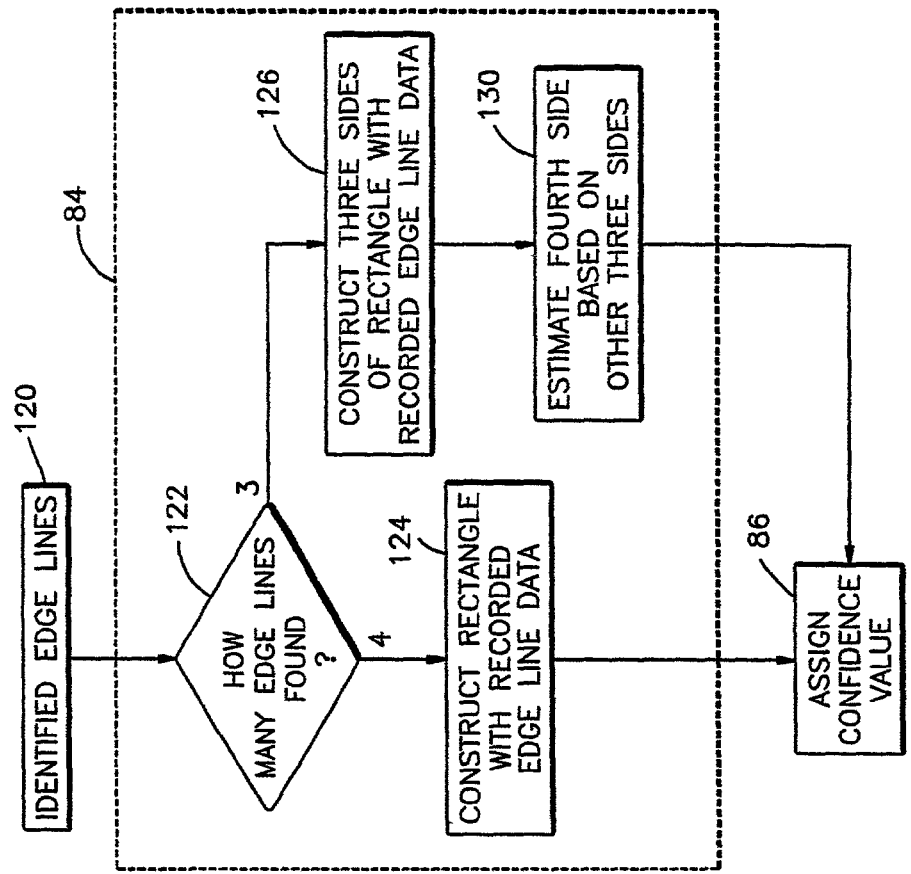
FIGS. 6 and 7 are a functional block diagrams illustrating a process performed during steps in the process of FIG. 3.

The process performed by the rectangle construction step 84 is illustrated in FIG. 7. Referring to FIG. 7, the edge lines 120 identified at steps 72, 74, 76, and 80 (FIG. 5) are evaluated at step 122 (FIG. 7) to determine how many lines have been identified. If four lines are identified, the process proceeds to step 124, where a rectangle is constructed using the identified edge lines 120. At step 124, the rectangle is constructed in the Cartesian coordinate system of the binary image 20 (FIG. 1) using the angle θ and distance ρ associated with each of the edge lines 120. The edge lines 120 are constructed as having an infinite length and the corners of the rectangles are determined at the intersection of the edge lines. The process then proceeds to step 86 (FIGS. 5 and 7), where a confidence value is assigned to the rectangle.

At step 122, if three edge lines 120 are identified, the process proceeds to step 126, where three sides of a rectangle are constructed using the identified edge lines. At step 126, the three sides are constructed in the Cartesian coordinate system of the binary image 20 (FIG. 1) using the angle θ and distance ρ associated with each of the edge lines 120. The edge lines 120 are constructed as having an infinite length and the corners of the rectangles are determined at the intersection of the edge lines. The process then proceeds to step 130.

At step 130, the fourth side of the rectangle is estimated based on the parametric data associated with the cells representative of the other three sides. This estimation is done by constructing a side parallel to the opposite side and extending between the free ends of the other two known sides. The position of the free ends is determined based on the length of the sides determined by the magnitude of the cells in the accumulator array 42 associated with the sides. Once the rectangle is constructed, the process proceeds to step 86 (FIGS. 5 and 7), where a confidence value is assigned to the constructed rectangle.

The identified edge lines used to construct the rectangle at step 84 thus represent a potential solution set indicative of a rectangle in the image that represents the edges of the parcel in the image. At step 86 (FIG. 5), a confidence value is assigned to the rectangle (solution set) constructed at step 84. The confidence value provides a means by which to indicate of a degree of certainty as to whether the rectangle constructed at step 84 is representative of the edges 28 of the parcel 12 (FIG. 1) in the binary image 20. The confidence value may incorporate any suitable system or scale (e.g., numerical, alphabetical, alphanumeric, etc.) by which this degree of certainty can be evaluated.

For example, the confidence value may be a numerical value that ranges from zero to one (0.0–1.0). In this example, a confidence value of 1.0 indicates a high confidence that the rectangle is indicative of the edges of the parcel. Conversely, a confidence value of 0.0 indicates zero confidence that the rectangle is indicative of the edges of the parcel.

For each rectangle constructed at step 84 (FIG. 5), the confidence value 86 is initialized to a high confidence value. The confidence value is then adjusted based on calculations using the parametric data (angle θ, distance ρ, and magnitude) associated with the cells representative of the identified rectangle sides. The calculations are illustrated in the following paragraphs. In these examples, the calculations are described in terms of the example in which the confidence value ranges from zero to one (0.0–1.0). It will thus be appreciated that the calculations would vary depending on the particular system used to assign the confidence value.

1.) If, at step 74, no parallel partner line for the selected edge line was found, subtract 0.20 from the confidence value. This reduces the confidence value in the event that only three sides of a rectangle are found.

2.) If, at step 74, a parallel partner line for the selected edge line was found, adjust the confidence value as follows:

$$Val_{ConfNew} = Val_{ConfOld} - \left(\frac{Mag_{PotEdgeLine} - Mag_{ParallelPartner}}{Mag_{PotEdgeLine}}\right) \times 0.25 \quad (2)$$

where:

$Val_{ConfNew}$=New confidence value;

$Val_{ConfOld}$=Old confidence value;

$Mag_{PotEdgeLine}$=Magnitude of the potential edge line;

$Mag_{ParallelPartner}$=Magnitude of the parallel partner for the potential edge line.

This reduces the confidence value by a factor related to the difference in length (magnitude) between the potential edge line ($Mag_{PotEdgeLine}$) and the parallel partner for the potential edge line ($Mag_{ParallelPartner}$).

3.) Reduce the confidence value by the following:

$$Val_{ConfNew} = Val_{ConfOld} - \left(\frac{\theta_{PotEdgeLine} - \theta_{ParallelPartner}}{\theta_{DeltaThreshold}}\right) \times 0.05 \quad (3)$$

where:

$\theta_{PotEdgeLine}$=the angle θ associated with the potential edge line;

$\theta_{ParallelPartner}$=the angle θ associated with the parallel partner for the potential edge line;

θDeltaThreshold=a predetermined threshold difference between $\theta_{PotEdgeLine}$ and $\theta_{ParallelPartner}$.

This reduces the confidence value by a factor that is related to the degree to which the angle θ associated with the potential edge line ($\theta_{PotEdgeLine}$) differs from the angle θ associated with the parallel partner for the potential edge line ($\theta_{ParallelPartner}$).

4.) If, at step 80, no perpendicular point was found, subtract 0.20 from the confidence value. This reduces the confidence value in the event that only three sides of a rectangle are found.

5.) If, at step 80, a perpendicular point was found, adjust the confidence value as follows:

$$Val_{ConfNew} = Val_{ConfOld} - \left(\frac{\theta_{PotEdgeLine} - \theta_{FirstPerpLine}}{\theta_{DeltaThreshold}}\right) \times 0.05 \quad (4)$$

where:

θFirstPerpLine=the angle θ associated with the first line perpendicular to the potential edge line.

This reduces the confidence value by a factor that is related to the degree to which the angle θ associated with the potential edge line ($\theta_{PotEdgeLine}$) differs from the angle θ associated with the first line perpendicular to the potential edge line ($\theta_{FirstPerpLine}$).

6.) If, at step 80, no perpendicular partner was found, subtract 0.20 from the confidence value. This reduces the confidence value in the event that only three sides of a rectangle are found.

7.) If, at step 80, a parallel partner for the first perpendicular line was found, adjust the confidence value as follows:

$$Val_{ConfNew} = Val_{ConfOld} - \left(\frac{\theta_{PotEdgeLine} - \theta_{PerpPartnerLine}}{\theta_{DeltaThreshold}}\right) \times 0.05 \quad (5)$$

where:

$\theta_{PerpPartnerLine}$=the angle θ associated with the parallel partner for the first perpendicular line.

This reduces the confidence value by a factor that is related to the degree to which the angle θ associated with the potential edge line ($\theta_{PotEdgeLine}$) differs from the angle θ associated with the parallel partner for the first perpendicular line ($\theta_{PerpPartnerLine}$).

8.) If both a first perpendicular line and a parallel partner for the first perpendicular line are found at steps 76 and 80, adjust the confidence value as follows:

$$Val_{ConfNew} = Val_{ConfOld} - \left(\frac{Mag_{FirstPerpLine} - Mag_{PerpPartnerLine}}{Mag_{FirstPerpLine}}\right) \times 0.25 \quad (6)$$

where:

$Mag_{FirstPerpLine}$=Magnitude of the first line perpendicular to the potential edge line;

$Mag_{PerpPartnerLine}$=Magnitude of the parallel partner for the first perpendicular line.

This reduces the confidence value by a factor related to the difference in length (magnitude) between the first line perpendicular to the potential edge line ($Mag_{FirstPerpLine}$) and the parallel partner for the first perpendicular line ($Mag_{PerpPartnerLine}$).

9.) If both a first perpendicular point and a perpendicular partner are found at steps 76 and 80, reduce the confidence value by the following:

$$Val_{ConfNew} = Val_{ConfOld} - \left(\frac{\theta_{FirstPerpLine} - \theta_{PerpPartnerLine}}{\theta_{DeltaThreshold}}\right) \times 0.05 \quad (7)$$

This reduces the confidence value by a factor that is related to the degree to which the angle θ associated with the first line perpendicular to the potential edge line ($\theta_{FirstPerpLine}$) differs from the angle θ associated with the parallel partner for the first perpendicular line ($\theta_{PerpPartnerLine}$).

10.) If confidence value is adjusted to a velue less than zero, set the confidence value equal to zero. This ensures that the confidence value associated with any given rectangle is not negative.

Once the confidence value for the constructed rectangle is calculated at step 86, the process proceeds to step 90, where a determination is made as to whether there are any more potential edge lines. If there are more potential edge lines, the process proceeds to step 92, where the next potential edge line is selected and the process proceeds as described above. If there are no more remaining potential edge lines to evaluate, the process proceeds to step 94.

At step 94, the rectangle with the highest assigned confidence value is selected as being indicative of the edges 28 (FIG. 1) of the parcel 12 in the binary image 20. The parcel image 34 may thus be extracted from the binary image 20 and, thus, the image 17. The parcel image 34 is then provided to a parcel image processing portion 36 of the system 10, where the information in the parcel image 34 is processed. This information may then be provided to parcel sorting and/or routing equipment 38 of the system 10.

From the above description of the invention, those skilled in the art will perceive improvements, changes and modifications. For example, in the accumulator array analysis 44 of the illustrated embodiment, a confidence value is assigned for each rectangle constructed at step 84 and the rectangle with the highest confidence value is selected as being representative of the parcel image 34. It will be appreciated, however, that the accumulator array analysis 44 could be adapted to evaluate the rectangles as each is assigned a confidence value. In this instance, a rectangle having a confidence value at or above a predetermined threshold may be selected as being representative of the parcel image 34, in which case further analysis of the accumulator array 42 may cease. Such improvements, changes and modifications within the skill of the art are intended to be covered by the appended claims.

Having described the invention, the following is claimed:

1. A method for identifying edges of an object in an image by analyzing an accumulator array produced via a Hough transformation of the image, the array including a plurality of cells arranged in rows associated with an angle (θ) and columns associated with a distance (ρ), said method comprising the steps of:

stepping through the cells in a first row of the array inward from opposite ends of the first row to identify a first cell in the first row associated with a first potential edge line of the object;

stepping inward from the end of the first row opposite the end from which the first cell was identified to identify a second cell in the first row associated with a second potential edge line of the object opposite the first edge;

stepping through the cells in a second row of the array shifted ninety degrees from said first row to identify a third cell in the second row associated with a third potential edge line of the object; and stepping inward from the end of the second row opposite the end from which the third cell was identified to identify a fourth cell in the array associated with a fourth potential edge line in the image.

2. The method recited in claim 1, wherein said step of stepping through the cells in the first row comprises the step of selecting the first cell from a group of cells identified as potential edge lines in the array, said group of cells being determined by the steps of:

identifying a predetermined number of cells in each row having a magnitude above a predetermined threshold, ceasing examination of the cells in each row once said predetermined number of cells are identified in the row; and placing said identified cells in said group of cells.

3. The method recited in claim 2, wherein said step of identifying a predetermined number of cells in each row comprises the steps of:

identifying one of said cells having a magnitude above the predetermined threshold while stepping inward from a first one of said opposite ends of the row;

identifying another one of said cells having a magnitude above the predetermined threshold while stepping inward from the other of said opposite ends of the row; and repeating the above steps until said predetermined number of cells in the row are identified.

4. The method recited in claim 1, wherein said step of stepping through the cells in the second row comprises the step of examining the cells of said second row by stepping through the cells in an inward direction from an end of said second row that coincides with the end of said first row from which said first cell was identified.

5. The method recited in claim 1 further comprising the steps of:
constructing a first line on the image in accordance with parametric data associated with said first cell;
constructing a second line on the image in accordance with parametric data associated with said second cell;
constructing a third line on the image in accordance with parametric data associated with said third cell;
constructing a fourth line on the image in accordance with parametric data associated with said fourth cell;
identifying intersections of said first, second, third, and fourth lines as indicating corners of the object; and
identifying portions of said first, second, third, and fourth lines extending between said intersections as indicating edges of the object.

6. The method recited in claim 1 further comprising the steps of:
constructing three lines on said image in accordance with parametric data associated with three of said first, second, third, and fourth cells of the array;
constructing a fourth line on said image, said fourth line being estimated from the parametric data used to construct said three lines;
identifying intersections of said three lines and said fourth line as indicating corners of the object; and
identifying portions of said lines extending between said intersections of said lines as indicating edges of the object.

7. The method recited in claim 1, wherein the first, second, third, and fourth cells comprise a solution set for the edges of the object in the image, said method further comprising the steps of:
assigning a confidence value to said solution set, said confidence value being calculated as a function of parametric data associated with each cell in the solution set; and
identifying based on said confidence value said solution set as including cells indicative of edges of the object.

8. A computer product for identifying edges of an object in an image by analyzing an accumulator array produced via a Hough transformation of the image, the array including a plurality of cells arranged in rows associated with an angle ($\theta$) and columns associated with a distance ($\rho$), said computer product comprising:
a portion for stepping through the cells in a first row of the array inward from opposite ends of the first row to identify a first cell in the first row associated with a first edge of the object;
a portion for stepping inward from the end of the first row opposite the end from which the first cell was identified to identify a second cell in the first row associated with a second edge of the object opposite the first edge;
a portion for stepping through the cells in a second row of the array shifted ninety degrees from said first row to identify a third cell in the second row associated with a third edge of the object; and
a portion for stepping inward from the end of the second row opposite the end from which the third cell was identified to identify a fourth cell in the array associated with a fourth edge in the image.

9. The computer product recited in claim 8, wherein said portion for stepping through the cells in the first row comprises a portion for selecting the first cell from a group of cells identified as potential edge lines in the array, said computer product further comprising a portion for determining said group of cells, said portion for determining said group of cells comprising:
a portion for identifying a predetermined number of cells in each row having a magnitude above a predetermined threshold,
said portion for examining ceasing examination of the cells in each row once said predetermined number of cells are identified in the row; and
a portion for placing said identified cells in said group of cells.

10. The computer product recited in claim 9, wherein said portion for identifying a predetermined number of cells in each row comprises:
a portion for identifying one of said cells having a magnitude above the predetermined threshold while stepping inward from a first one of said opposite ends of the row;
a portion for identifying another one of said cells having a magnitude above the predetermined threshold while stepping inward from the other of said opposite ends of the row; and
a portion for repeating the above steps until said predetermined number of cells in the row are identified.

11. The computer product recited in claim 8, wherein said portion for stepping through the cells in the second row comprises a portion for examining the cells of said second row by stepping through the cells in an inward direction from an end of said second row that coincides with the end of said first row from which said first cell was identified.

12. The computer product recited in claim 8 further comprising:
a portion for constructing a first line on the image in accordance with parametric data associated with said first cell;
a portion for constructing a second line on the image in accordance with parametric data associated with said second cell;
a portion for constructing a third line on the image in accordance with parametric data associated with said third cell;
a portion for constructing a fourth line on the image in accordance with parametric data associated with said fourth cell;
a portion for identifying intersections of said first, second, third, and fourth lines as indicating corners of the object; and
a portion for identifying portions of said first, second, third, and fourth lines extending between said intersections as indicating edges of the object.

13. The computer product recited in claim 8 further comprising:
a portion for constructing three lines on said image in accordance with parametric data associated with three of said first, second, third, and fourth cells of the array;

a portion for constructing a fourth line on said image, said fourth line being estimated from the parametric data used to construct said three lines;

a portion for identifying intersections of said three lines and said fourth line as indicating corners of the object; and a portion for identifying portions of said lines extending between said intersections of said lines as indicating edges of the object.

14. The computer product recited in claim 8, wherein the first, second, third, and fourth cells define solution set for the edges of the object in the image, said computer product further comprising:

a portion for assigning a confidence value to said solution set, said confidence value being calculated as a function of parametric data associated with each cell in the solution set; and a portion for identifying based on said confidence value said solution set as including cells indicative of edges of the object.

15. A method for identifying edges of an object in a graphical image by analyzing a Hough image of the graphical image, said method comprising the steps of:

searching the Hough image from a first edge of the Hough image towards the center of the Hough image for a first potential edge line of the object in the graphical image;

searching the Hough image from a second edge of the Hough image opposite the first edge towards the center of the Hough image for a second potential edge line of the object in the graphical image, the first and second edge lines being opposite edges of the object;

searching the Hough image from a third edge of the Hough image transverse the first and second edges towards the center of the Hough image for a third potential edge line of the object in the graphical image;

searching the Hough image from a fourth edge of the Hough image opposite the third edge towards the center of the Hough image for a fourth potential edge line of the object in the graphical image, the third and fourth edge lines being opposite edges of the object.

16. The method recited in claim 15, wherein said Hough image comprises an accumulator array comprising a plurality of cells arranged in rows associated with an angle ($\theta$) and columns associated with a distance ($\rho$);

said step of searching for a first potential edge line comprising the step of searching a first row of the array from a first end of the first row toward a center of the first row for a first cell indicative of said first edge line;

said step of searching for a second potential edge line comprising the step of searching said first row of the array from a second end of the first row opposite the first end of the first row toward a center of the first row for a second cell indicative of said second edge line;

said step of searching for a third potential edge line comprising the step of searching a second row of the array shifted ninety degrees from said first row of the array from a first end of the second row toward a center of the second row for a third cell indicative of said third edge line; and said step of searching for a fourth potential edge line comprising the step of searching said second row of the array from a second end of the second row opposite the first end of the second row toward a center of the second row for a fourth cell indicative of said fourth edge line.

\* \* \* \* \*